(12) United States Patent
Jo et al.

(10) Patent No.: US 11,768,518 B1
(45) Date of Patent: Sep. 26, 2023

(54) HEAD SECUREMENT FOR HEAD-MOUNTABLE DEVICE

(71) Applicant: Apple Inc., Cupertino, CA (US)

(72) Inventors: Yoonhoo Jo, Santa Cruz, CA (US); Paul X. Wang, Cupertino, CA (US); Heidi Williamson, San Francisco, CA (US); Trevor J Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/372,336

(22) Filed: Jul. 9, 2021

Related U.S. Application Data

(60) Provisional application No. 63/065,411, filed on Aug. 13, 2020.

(51) Int. Cl.
*G06F 1/16* (2006.01)
*G02B 27/01* (2006.01)

(52) U.S. Cl.
CPC .......... *G06F 1/163* (2013.01); *G02B 27/0176* (2013.01)

(58) Field of Classification Search
CPC ....... G06F 1/163; G06F 3/011; G02B 27/017; G02B 27/0176; A61F 9/027
USPC .................................................... 361/679.03
See application file for complete search history.

(56) References Cited

U.S. PATENT DOCUMENTS

| | | | | |
|---|---|---|---|---|
| 5,880,773 A | * | 3/1999 | Suzuki | G02B 27/04 348/121 |
| 9,778,467 B1 | * | 10/2017 | White | G02B 27/0176 |
| 9,851,567 B2 | | 12/2017 | Cazalet | |
| 10,095,275 B2 | | 10/2018 | Byun et al. | |
| 10,178,457 B1 | * | 1/2019 | Tao | G06F 3/011 |
| 10,663,737 B1 | * | 5/2020 | Magrath | G02B 27/0176 |
| 10,747,005 B1 | * | 8/2020 | Sullivan | G02B 27/0176 |
| 10,845,604 B2 | | 11/2020 | Morimoto | |
| 10,983,345 B2 | * | 4/2021 | Kim | G06F 1/163 |
| 11,442,280 B2 | * | 9/2022 | McCracken | G02B 27/0176 |
| 11,480,801 B1 | * | 10/2022 | Morris | G02B 27/0176 |
| 2004/0061663 A1 | * | 4/2004 | Reynolds | G02B 27/0176 348/E13.041 |
| 2015/0235426 A1 | * | 8/2015 | Lyons | A63F 13/26 345/8 |
| 2017/0082859 A1 | * | 3/2017 | Drinkwater | G02B 27/0176 |
| 2017/0131555 A1 | * | 5/2017 | Drinkwater | G02B 27/0176 |
| 2017/0153672 A1 | * | 6/2017 | Shin | G06F 1/1654 |
| 2017/0318281 A1 | * | 11/2017 | Edlund | G02B 27/0172 |
| 2017/0337737 A1 | * | 11/2017 | Edwards | F16M 13/04 |
| 2018/0045967 A1 | * | 2/2018 | Osterhout | G06F 3/03547 |
| 2019/0028697 A1 | * | 1/2019 | Sullivan | H04N 13/344 |
| 2019/0041899 A1 | * | 2/2019 | Ellis | G06F 1/163 |
| 2019/0137765 A1 | * | 5/2019 | Chang | G02B 27/0176 |

(Continued)

*Primary Examiner* — Adrian S Wilson
*Assistant Examiner* — Gage Crum
(74) *Attorney, Agent, or Firm* — BAKERHOSTETLER

(57) ABSTRACT

Systems of the present disclosure can provide a head-mountable device with a head securement element that is integrated with a light seal module, which provides effective and comfortable engagement with a face of the user. By providing the head securement element with a light seal module, both head securement and face engagement can be customized or otherwise selected for achieving the desired fit for a given user. Accordingly, the head securement element (e.g., band, arms, and the like) can be primarily or exclusively secured to an HMD module via a light seal module.

15 Claims, 5 Drawing Sheets

(56) References Cited

U.S. PATENT DOCUMENTS

| | | | |
|---|---|---|---|
| 2019/0380875 A1* | 12/2019 | Esmonde | A61F 9/022 |
| 2021/0080996 A1* | 3/2021 | Hudman | G06F 1/1679 |
| 2021/0208408 A1* | 7/2021 | Boger | G06F 3/011 |
| 2021/0356750 A1* | 11/2021 | Shin | G02B 27/0172 |

* cited by examiner

HEAD SECUREMENT FOR HEAD-MOUNTABLE DEVICE

CROSS-REFERENCE TO RELATED APPLICATION

This application claims the benefit of U.S. Provisional Application No. 63/065,411, entitled "HEAD SECUREMENT FOR HEAD-MOUNTABLE DEVICE," filed Aug. 13, 2020, the entirety of which is incorporated herein by reference.

TECHNICAL FIELD

The present description relates generally to head-mountable devices, and, more particularly, to head securement mechanisms for securing a head-mountable devices to a head of a user.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

A head-mountable device can be secured to a head of a user while being worn and used by the user. It can be desirable to maximize the fit and comfort on the user, so that usage of the head-mountable device for extended durations is not difficult for the user.

Some head-mountable devices are designed to secure to the head of the user by wrapping tightly around the back of the user's head, for example, with a band. This arrangement often involves providing a tightness that can secure the head-mountable device to a variety of head shapes and sizes. However, this can be somewhat uncomfortable for at least some users. Another arrangement can require the user to adjust the head securement mechanism to achieve the desired fit. Such an arrangement requires additional effort from the user to achieve the desired fit.

It can be desirable to provide a head securement element that is integrated with a light seal module, which provides effective and comfortable engagement with a face of the user. By providing the head securement element with a light seal module, both head securement and face engagement can be customized or otherwise selected for achieving the desired fit for a given user. Accordingly, the head securement element (e.g., band, arms, and the like) can be primarily or exclusively secured to an HMD module via a light seal module.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
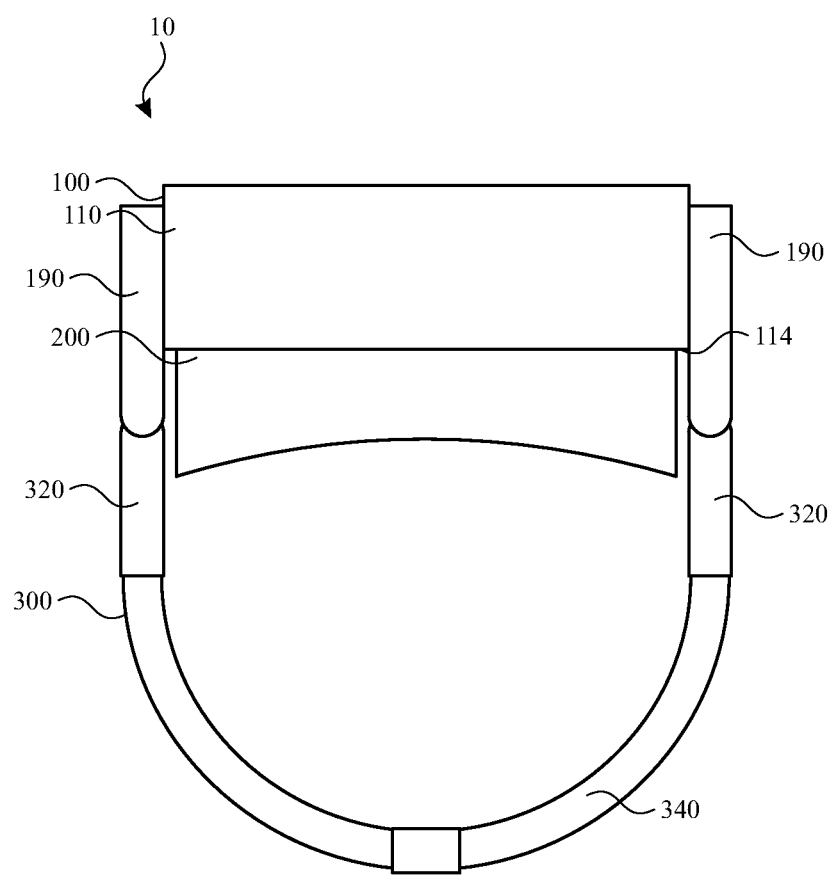
FIG. 1 illustrates a top view of a head-mountable device, according to some embodiments of the present disclosure.

As shown in FIG. 1, a head-mountable device 10 can include an HMD module 100, a light seal module 200, and a head securement element 300. The HMD module 100 can include a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can provide structure around a peripheral region thereof to support any internal components of the HMD module 100 in their assembled position. For example, the frame 110 can enclose and support various internal components (including for example integrated circuit chips, processors, memory devices and other circuitry) to provide computing and functional operations for the head-mountable device 10, as discussed further herein.

As further shown in FIG. 1, the head securement element 300 can include arms 320 on opposing sides of the head-mountable device 10. Each of the arms 320 can be pivotably coupled to the HMD module 100 of the head-mountable device 10. For example, the HMD module 100 can include extensions 190 that extend from and/or are integrally formed with the frame 110. The extensions 190 and the frame 110 can form a continuous, rigid structure. It will be understood that the extensions 190 can optimally be a portion of the frame 110 or another component of the HMD module 100. The head securement element 300 can further include a band 340 for extending to and/or about a rear side of the head of the user. The band 340 can optionally extend from ends of the arms 320. The band 340 can be stretchable to comfortably provide tension about the head of the user. For example, the band 340 can include fabric, elastic, polymers, woven materials, braided materials, and the like.

The light seal module 200 can define an interior space through which light can pass, thereby providing to the user wearing the head-mountable device a view of a display element of the HMD module 100. Such a view can be enhanced by preventing the ingress of light from the external environment and into the light seal module 200. To provide an effective light seal, a comfortable fit, and proper alignment of the HMD module 100, the light seal module 200 can be customized and/or selected for a particular user. As such, a given HMD module 100 can be used with various users where each user is provided with an appropriate light seal module 200 that provides the desired fit.

However, by connecting the head securement element 300 to the HMD module 100 rather than the light seal module 200, the head securement element 300 may require adjustment capabilities and/or operation by a user to achieve the desired fit. Additionally, the arms 320 or other components may be obstructed somewhat by at least some light seal modules, where the arms 320 or other components may otherwise be capable of transitioning to a collapsed or other compact configuration.

It can be desirable to provide a head securement element that is integrated with a light seal module, which provides effective and comfortable engagement with a face of the user. By providing the head securement element with a light seal module, both head securement and face engagement can be customized or otherwise selected for achieving the desired fit for a given user. Accordingly, the head securement element (e.g., band, arms, and the like) can be primarily or exclusively secured to an HMD module via a light seal module.

Figure 2:
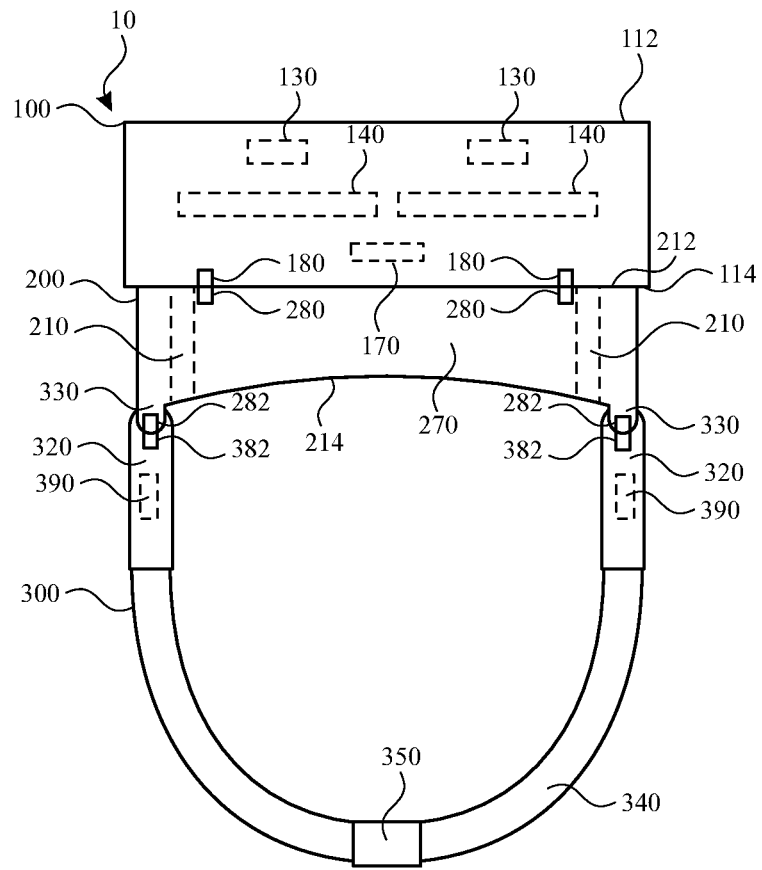
FIG. 2 illustrates a top view of a head-mountable device, according to some embodiments of the present disclosure.
Figure 3:
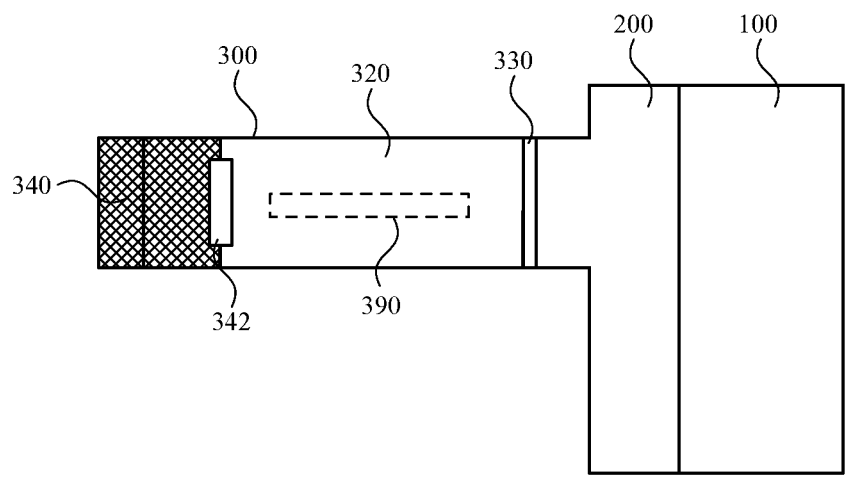
FIG. 3 illustrates a side view of the head-mountable device of FIG. 2, according to some embodiments of the present disclosure.

Referring now to FIGS. 2 and 3, a head-mountable device 10 can include an HMD module 100, a light seal module 200, and a head securement element 300. The head securement element 300 can be connected to the HMD module 100 via the light seal module 200.

The HMD module 100 includes a frame 110 that is worn on a head of a user. The frame 110 can be positioned in front of the eyes of a user to provide information within a field of view of the user. The HMD module 100 and/or the light seal module 200 can provide a nosepiece to rest on a user's nose.

The frame 110 can provide structure around a peripheral region thereof to support any internal components of the HMD module 100 in their assembled position. For example, the frame 110 can enclose and support various internal components (including for example integrated circuit chips, processors, memory devices and other circuitry) to provide computing and functional operations for the head-mountable device 10, as discussed further herein. While several components are shown within the frame 110, it will be understood that some or all of these components can be located anywhere within or on the head-mountable device 10. For example, one or more of these components can be positioned within the light seal module 200 and/or the head securement element 300 of the head-mountable device 10.

The frame 110 can include and/or support one or more camera modules 130. The camera modules 130 can be positioned on or near an outer side 112 of the frame 110 to capture images of views external to the head-mountable device 10. As used herein, an outer side of a portion of a head-mountable device is a side that faces away from the user and/or towards an external environment. The captured images can be used for display to the user or stored for any other purpose. Each of the camera modules 130 can be movable along the outer side 112. For example, a track or other guide can be provided for facilitating movement of the camera module 130 therein.

The head-mountable device 10 can include display elements 140 that provide visual output for viewing by a user wearing the head-mountable device 10. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera module) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

The pair of display elements 140 can be mounted to the frame 110 and separated by a distance. The distance between the pair of display elements 140 can be designed to correspond to the IPD of a user. The distance can be adjustable to account for different IPDs of different users that may wear the head-mountable device 10. For example, either or both of the display elements 140 may be movably mounted to the frame 110 to permit the display elements 140 to move or translate laterally to make the distance larger or smaller. Any type of manual or automatic mechanism may be used to permit the distance between the display elements 140 to be an adjustable distance. For example, the display elements 140 can be mounted to the frame 110 via slidable tracks or guides that permit manual or electronically actuated movement of one or more of the display elements 140 to adjust the distance there between.

Additionally or alternatively, the display elements 140 can be moved to a target location based on a desired visual effect that corresponds to user's perception of the display element 140 when it is positioned at the target location. The target location can be determined based on a focal length of the user and/or optical elements of the system. For example, the user's eye and/or optical elements of the system can determine how the visual output of the display element 140 will be perceived by the user. The distance between the display element 140 and the user's eye and/or the distance between the display element 140 and one or more optical elements can be altered to place the display element 140 at, within, or outside of a corresponding focal distance. Such adjustments can be useful to accommodate a particular user's eye, corrective lenses, and/or a desired optical effect.

As shown in FIG. 2, the light seal module 200 can include a chassis 210 that provides structural support to one or more other components of the light seal module 200. The chassis 210, or portions thereof, can extend to, from, and/or between an inner side 214 and an outer side 212. The chassis 210 can support a cover 270 that extends at least partially from the outer side 212 to the inner side 214. The cover 270 can extend entirely and continuously about a periphery of the light seal module 200, such that an interior space is open at only two ends (e.g., on the inner side 214 and the outer side 212). The chassis 210 and/or the cover 270 can define the interior space through which light can pass, thereby providing to the user wearing the head-mountable device a view of a display element of the HMD module 100. Such a view can be enhanced by preventing the ingress of light from the external environment and into the light seal module 200.

As further shown in FIG. 2, attachment elements can facilitate coupling of the HMD module 100 to the light seal module 200 in a relative position and orientation that aligns the display elements 140 of the HMD module 100 in a preferred position and orientation for viewing by the user. The HMD module 100 and the light seal module 200 can be coupled to prevent ingress of light from an external environment. For example, HMD module attachment elements 180 can releasably engage light seal module attachment elements 280. One or more of various mechanisms can be provided to secure the modules to each other. For example, mechanisms such as locks, latches, snaps, slides, channels, screws, clasps, threads, magnets, pins, an interference (e.g., friction) fit, knurl presses, bayoneting, fused materials, weaves, knits, braids, and/or combinations thereof can be included to couple and/or secure the HMD module 100 and the light seal module 200 together. The modules can remain secured to each other until an optional release mechanism is actuated. The release mechanism can be provided on an outer surface of the head-mountable device 10 for access by a user.

While the light seal module 200 is shown schematically with a particular size and shape, it will be understood that the size and shape of the light seal module 200, particularly at the inner side 214 of the light seal module 200, can have a size and shape that accommodates the face of a user wearing the head-mountable device 10. For example, the inner side 214 can provide a shape that generally matches the contours of the user's face around the eyes of the user. The inner side 214 can be provided with one or more features that allow the light sealed module 200 to conform to the face of the user to enhance comfort and block light from entering the light sealed module 200 at the point of contact with the face. For example, the inner side 214 can provide a flexible, soft, elastic, and/or compliant structure.

The HMD module 100 and/or the light seal module 200 can include a sensor 170. The sensor 170 can be positioned and arranged to detect a characteristic of the user, such as facial features. For example, such a user sensor can perform facial feature detection, facial movement detection, facial recognition, eye tracking, user mood detection, user emotion detection, voice detection, and the like. The head-mountable device 10 can facilitate such detections by reducing the load (e.g., weight) on the user's and distributing forces to other regions of the user's head, such as the top, rear, and/or sides of the user's head, as discussed further herein.

The HMD module 100 and/or the light seal module 200 can be supported on a user's head with a head securement element 300. The head securement element 300 can wrap or extend along opposing sides of a user's head and/or to a rear of the user's head. The head securement element 300 can optionally include earpieces for wrapping around or otherwise engaging or resting on a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10.

As shown in FIGS. 2 and 3, the head securement element 300 can include arms 320 on opposing sides of the head-mountable device 10. Each of the arms 320 can be pivotably coupled to the light seal module 200 of the head-mountable device 10, for example at a corresponding hinge 330.

Attachment elements can facilitate coupling of the light seal module 200 to the head securement element 300. For example, light seal module attachment elements 282 can releasably engage head securement element attachment elements 382. One or more of various mechanisms can be provided to secure the components to each other. For example, mechanisms such as locks, latches, snaps, slides, channels, screws, clasps, threads, magnets, pins, an interference (e.g., friction) fit, knurl presses, bayoneting, fused materials, weaves, knits, braids, and/or combinations thereof can be included to couple and/or secure the light seal module 200 and the head securement element 300 together. The components can remain secured to each other until an optional release mechanism is actuated. The release mechanism can be provided on an outer surface of the head-mountable device 10 for access by a user.

As further shown in FIGS. 2 and 3, the head securement element 300 can further include a band 340 for extending to and/or about a rear side of the head of the user. The band 340 can optionally extend from ends of the arms 320. Alternatively, the arms 320 can be omitted and the band 340 can extend to ends of the head securement element 300. The band 340 can be stretchable to comfortably provide tension about the head of the user.

The head securement element 300 can further include an adjustment element 350 for adjusting a tightness and/or fit of the head securement element 300. The adjustment element 350 can, for example, be operated to alter a total length of the band 340 and/or a distance between the arms 320. The adjustment element 350 can be operated manually by a user and/or by a controller of the head-mountable device 10 (e.g., in the HMD module 100). Operation of the adjustment element 350 can alter the fit of the band 340 as well as the clamping force of the arms 320 on sides of the user's head.

As further shown in FIGS. 2 and 3, one or more of the arms 320 and/or another component of the head securement element 300 can include an electronic component 390. Optionally, the arms 320 can provide robust and rigid structures on sides of the user's head. Such structures can also be used to support electronic components 390 that are operably connected to other components of the head-mountable device 10 (e.g., in the HMD module 100). Additionally, the arms 320 provide a location that is preferred for certain components, such as speakers to direct sound to the ears of the user.

As shown in FIG. 3, the arms 320 and the band 340 of the head securement element 300 can be coupled together. In some examples, the arms 320 and the band 340 can have different construction and/or composition. For example, as described herein, the arms 320 can be substantially rigid, and the band 340 can be substantially flexible, bendable, and/or stretchable. The arms 320 and the band 340 can be coupled together by an attachment element 342. One or more of various mechanisms can be provided for the attachment element 342. For example, mechanisms such as fused materials, weaves, knits, braids, overmolding, co-molding, adhesive, and/or combinations thereof can be included to couple and/or secure the arms 320 and the band 340 together.

It will be understood that the arms 320 can be provided without the band 340. Alternatively, the band 340 can be provided without the arms 320. In yet other examples, other mechanisms can be provided with or as the head securement element 300, such as straps, belts, caps, hats, and the like.

Figure 4:
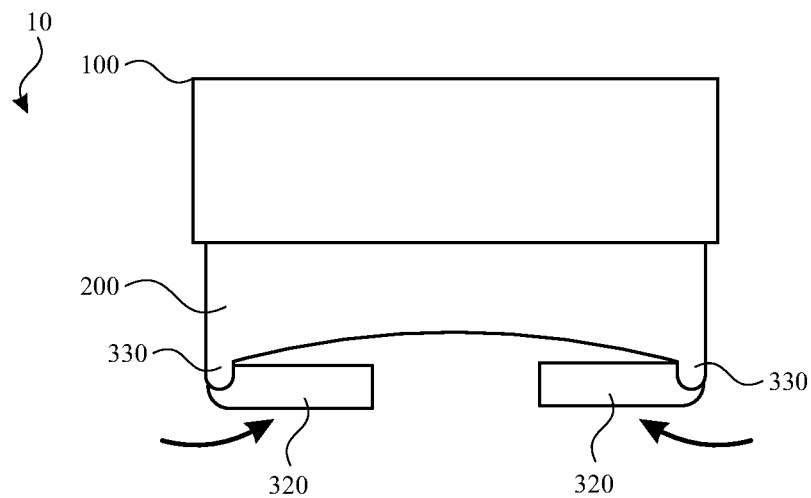
FIG. 4 illustrates a top view of a head-mountable device of FIG. 2 in a collapsed configuration, according to some embodiments of the present disclosure.

Referring now to FIG. 4, the arms of the head securement element can be adjusted to transition between a deployed configuration and a collapsed configuration. As shown in FIG. 4, each of the arms 320 can be pivoted with respect to the light seal module 200. Such movement can cause the arms 320 to move towards each other and into a more compact size and/or shape.

The arms 320 can be coupled to the light seal module 200 by hinges 330. The hinges 330 can allow the arms 320 to pivot relative to the light seal module 200, for example by moving towards or away from each other. The hinges 330 can pivotably couple the arms to a rigid chassis of the light seal module 200. By further example, the hinges 330 can provide rotation about axes that are parallel to each other and/or that extend substantially vertically along sides of the head-mountable device 10.

As the arms 320 are transitioned, the hinge 330 can allow rotation thereof when a force and/or torque is applied by a user. Upon release, the hinges 330 can maintain the arms 320 in either the collapsed configuration (FIG. 4) or the deployed configuration (FIGS. 2 and 3). For example, the hinges 330 can include a hollow clutch or other mechanism to provide internal friction that maintains a rotational orientation of the parts at low levels of torque. By further example, a higher level of torque can allow the arms 320 to pivot to a new configuration that is then maintained upon release.

As shown in FIG. 4, the light seal module 200 can be positioned such that it does not interfere with the transition of the arms 320 between a deployed configuration and a collapsed configuration. While the band 340 is not shown in FIG. 4, it will be understood that a band can be provided and transition with the arms 320. Where the band is generally compliant, the band can readily fold, bend, or flex to facilitate transitions of the arms 320.

Figure 5:
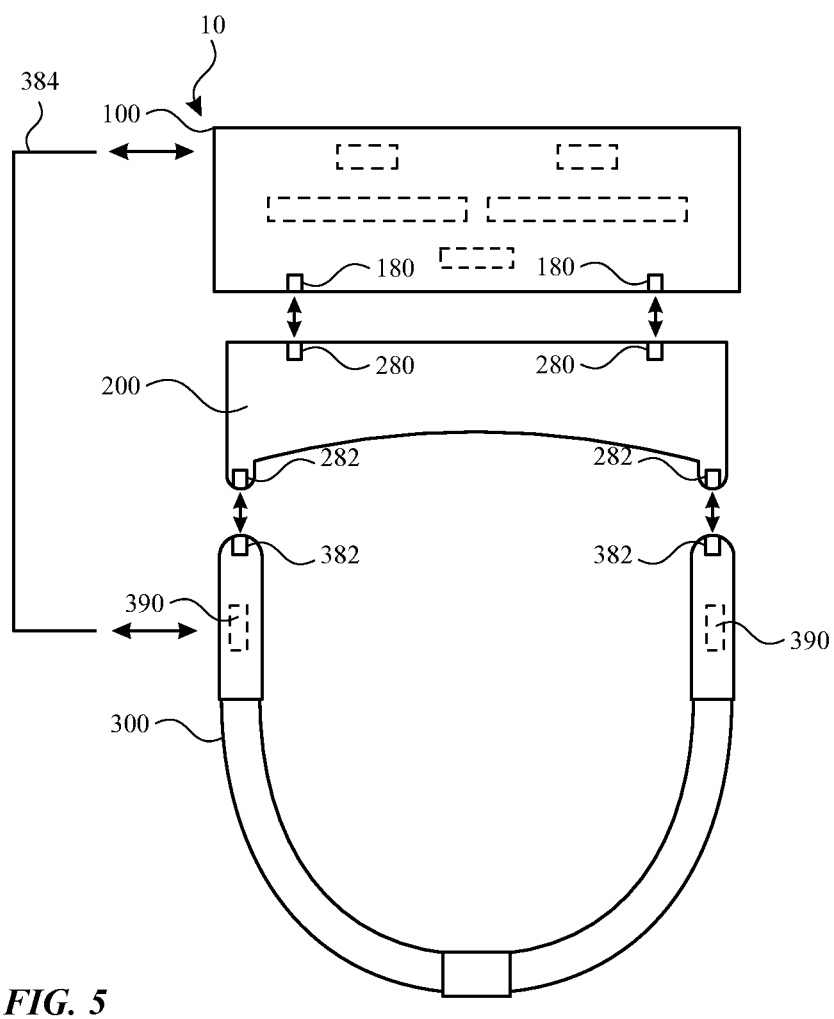
FIG. 5 illustrates a top exploded view of the head-mountable device of FIG. 2, according to some embodiments of the present disclosure.

Referring now to FIG. 5, the components of the head-mountable device 10 can be provided with modular configurations that facilitate engagement (e.g., assembly) and release. As used herein, "modular" or "module" can refer to a characteristic that allows an item, such as a nosepiece, to be connected, installed, removed, swapped, and/or exchanged by a user in conjunction with another item, such as a module of a head-mountable device. Connection of a light seal module, a head securement element, and/or an HMD module can be performed and reversed, followed by disconnection and connection of another module replacing the prior module. As such, multiple modules can be exchangeable with each other with respect to another module.

At least one of the size, shape, profile, dimension, aspect ratio, surface feature, texture, color, and/or markings can be different among multiple modules. For example, different modules can have different sizes and/or shapes to accommodate different user features (head size, shape, angle, and the like). This can allow a user to choose from among multiple light seal modules and/or head securement elements that provide different ergonomic features so the user can select one according to comfort provided and/or fit achieved.

As described herein, attachment elements can facilitate coupling of the HMD module 100 to the light seal module 200. For example, the HMD module attachment elements 180 can releasably engage the light seal module attachment elements 280. As further described herein, attachment elements can facilitate coupling of the light seal module 200 to the head securement element 300. For example, the light seal module attachment elements 282 can releasably engage the head securement element attachment elements 382.

By providing the head securement element 300 with the light seal module 200, both the light seal module 200 and the head securement element 300 can be provided as separate from the HMD module 100. As such, the light seal module 200 and the head securement element 300 can be provided with features that are customized, fitted, and/or sized for a particular user.

Operative connections can be provided between components of different modules. For example, the electronic component 390 of the head securement element 300 can be operatively connected to one or more components (e.g., electronic components) of the HMD module 100. Such an arrangement allows the components to be distributed so that the HMD module 100 can have a reduced size and weight. The distribution of weight can further provide greater comfort, securement, and balance to a user.

One or more electronic components 390 of the head securement element 300 can be operatively connected to the HMD module 100 via the light seal module 200. For example, the light seal module 200 can provided electrical (e.g., wired) connections, for example, to provide connections along the HMD module attachment elements 180, the light seal module attachment elements 280, the light seal module attachment elements 282, and/or the head securement element attachment elements 382. Additionally or alternatively, operative connections can be provided apart from the attachment elements. In such a case, such operative connections can be established when the corresponding attachment elements are engaged.

Additionally or alternatively, one or more electronic components 390 of the head securement element 300 can be operatively connected to the HMD module 100 without the light seal module 200. For example, a bypass connection 384 can provided an electrical (e.g., wired) connection, for example, by extending between the HMD module 100 and the head securement element 300 without passing through the light seal module 200.

One or more electronic components 390 of the head securement element 300 can be operatively connected to the HMD module 100 via a wireless connection. For example, the HMD module 100 and the head securement element 300 can each include wireless communication elements for transmitting and/or receiving wireless signals there between, as described further herein.

Figure 6:
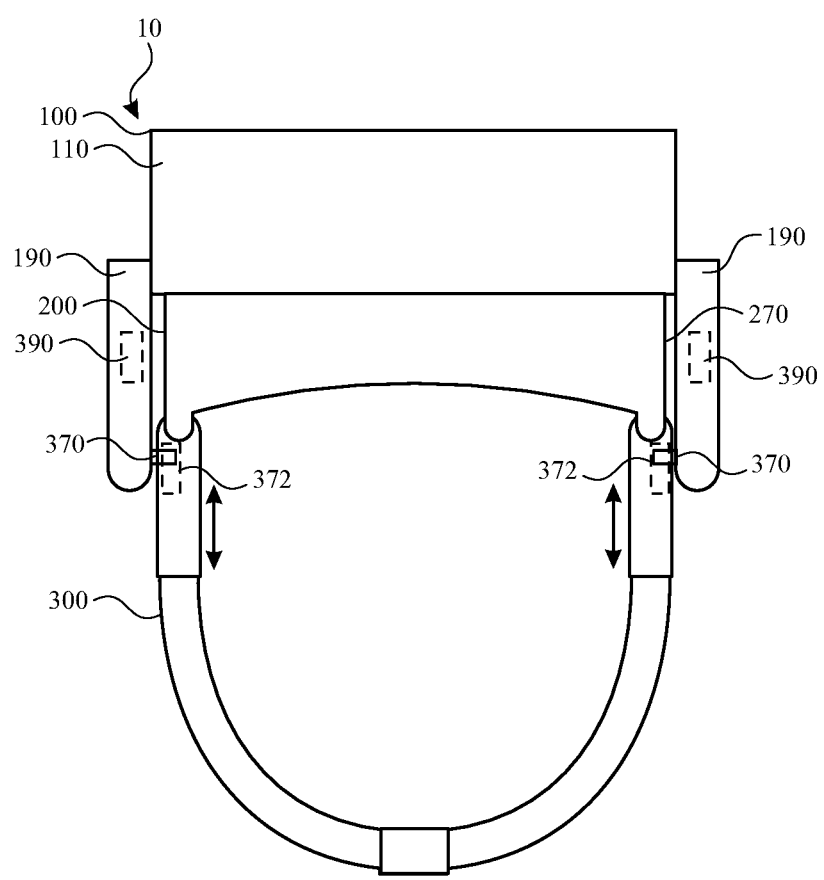
FIG. 6 illustrates a top view of a head-mountable device, according to some embodiments of the present disclosure.

Referring now to FIG. 6, the head securement element can be connected to both the HMD module and the light seal module. As shown in FIG. 6, the head securement element 300 can extend from and be connected to the light seal module 200. In addition, rather than being connected to the HMD module 100 by only the light seal module 200, the head securement element 300 can also be directly connected to the HMD module 100. In some examples, one or more portions of the HMD module 100 (e.g., the extensions 190) can provide engagement pins 370 that extend into channels 372 of the head securement element 300. Such engagement can limit relative movement of the head securement element 300 and the HMD module 100 to be within a range of motion while still facilitating some relative movement. Where the light seal module 200 and/or the head securement element 300 are flexible, bendable, and/or stretchable, it can be advantageous to maintain engagement while allowing limited movement.

Figure 7:
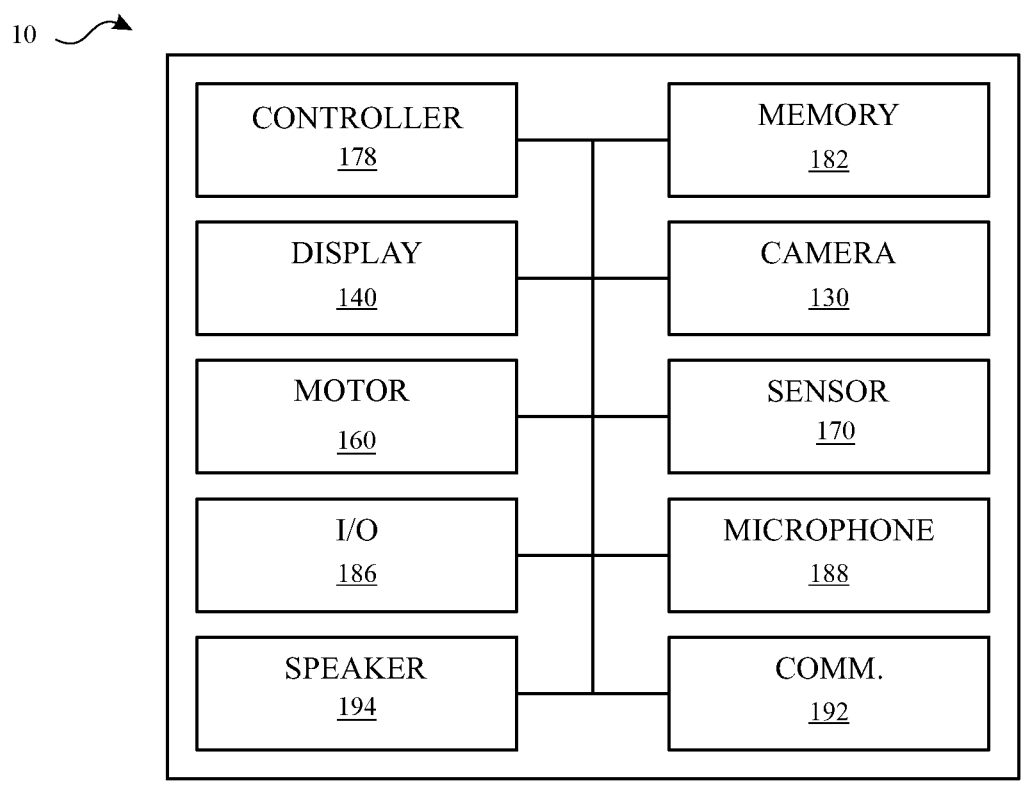
FIG. 7 illustrates a block diagram of a head-mountable device, in accordance with some embodiments of the present disclosure.

Referring now to FIG. 7, components of the head-mountable device can be operably connected to provide the performance described herein. FIG. 7 shows a simplified block diagram of an illustrative head-mountable device 10 in accordance with one embodiment of the invention. It will be appreciated that components described herein can be provided on one, some, or all of an HMD module, a light seal module, and/or a head securement element. It will be understood that additional components, different components, or fewer components than those illustrated may be utilized within the scope of the subject disclosure.

As shown in FIG. 7, the head-mountable device 10 can include a controller 178 (e.g., control circuitry) with one or more processing units that include or are configured to access a memory 182 having instructions stored thereon. The instructions or computer programs may be configured to perform one or more of the operations or functions described with respect to the head-mountable device 10. The controller 178 can be implemented as any electronic device capable of processing, receiving, or transmitting data or instructions. For example, the controller 178 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 10. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 10 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 140 for close up viewing. The optical subassembly can include one or more lenses, mirrors, or other optical devices.

The head-mountable device 10 can include adjustment control components, such as a motor 160, an actuator, and the like for moving components to a desired relative position, orientation, and/or configuration as described herein.

The head-mountable device 10 can include one or more sensors 170, as described herein. The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 10 can include an input/output component 186, which can include any suitable component for connecting head-mountable device 10 to other devices. Suitable components can include, for example, audio/video jacks, data connectors, or any additional or alternative input/output components. The input/output component 186 can include buttons, keys, or another feature that can act as a keyboard for operation by the user.

The head-mountable device 10 can include the microphone 188 as described herein. The microphone 188 can be operably connected to the controller 178 for detection of sound levels and communication of detections for further processing, as described further herein.

The head-mountable device 10 can include the speakers 194 as described herein. The speakers 194 can be operably connected to the controller 178 for control of speaker output, including sound levels, as described further herein.

The head-mountable device 10 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 10 can include a battery, which can charge and/or power components of the head-mountable device 10. The battery can also charge and/or power components connected to the head-mountable device 10.

Accordingly, embodiments of the present disclosure provide a head-mountable device with a head securement element that is integrated with a light seal module. The light seal module provides effective and comfortable engagement with a face of the user. By providing the head securement element with a light seal module, both head securement and face engagement can be customized or otherwise selected for achieving the desired fit for a given user. Accordingly, the head securement element (e.g., band, arms, and the like) can be primarily or exclusively secured to an HMD module via a light seal module.

Various examples of aspects of the disclosure are described below as clauses for convenience. These are provided as examples, and do not limit the subject technology.

Clause A: a head-mountable device comprising: an HMD module comprising: a frame having an inner side and an outer side; a display element supported by the frame; and an HMD module attachment element on the inner side of the frame; a light seal module comprising: a chassis having an inner side and an outer side; a light seal module attachment element on the outer side of the chassis, the light seal module attachment element being configured to releasably engage the HMD module attachment element; and a head securement element extending from the inner side of the light seal module and configured to extend along sides of a head of a user.

Clause B: a head-mountable device comprising: an HMD module comprising a display element; a light seal module coupled to the HMD module, the light seal module being configured to engage a face of a user, provide a view to the display element, and block light from an external environment; a head securement element configured hold the HMD module and the light seal module against a head of the user, the head securement element being coupled to the HMD module by only the light seal module.

Clause C: a head-mountable device comprising: an HMD module comprising a display element; and a light seal module comprising: a chassis; a cover extending about the chassis; and a head securement element comprising: a pair of arms, each of the arms being rigid and pivotably coupled to the chassis of the light seal module; and a band having ends coupled to the arms, the band being flexible to extend around a head of a user.

One or more of the above clauses can include one or more of the features described below. It is noted that any of the following clauses may be combined in any combination with each other, and placed into a respective independent clause, e.g., clause A, B, or C.

Clause 1: the head securement element comprises: a pair of arms, each of the arms being rigid and pivotably coupled to the chassis of the light seal module; and a band having ends coupled to the arms, the band being flexible to extend around the head of the user.

Clause 2: the ends of the band are coupled to the light seal module by the pair of arms.

Clause 3: the light seal module further comprises a cover extending about the chassis.

Clause 4: the head securement element is coupled to the HMD module by only the light seal module.

Clause 5: the head securement element is coupled to the HMD module by: the light seal module; and extensions extending from the frame and slidably connecting to the head securement element.

Clause 6: the head securement element comprises an electronic component.

Clause 7: the electronic component is operatively connected to the HMD module by the light seal module.

Clause 8: the electronic component is operatively connected to the HMD module by a wireless connection.

Clause 9: the electronic component is operatively connected to the HMD module by a wired connection that bypasses the light seal.

Clause 10: the light seal module is configured to be releasably coupled to the HMD module.

Clause 11: the head securement element is configured to be releasably coupled to the light seal module.

Clause 12: at least one of the arms comprises an electronic component operatively connected to the HMD module.

Clause 13: at least one of the arms comprises an electronic component operatively connected to the HMD module by the light seal module.

Clause 14: the HMD module further comprises an HMD module attachment element; and the light seal module further comprises a light seal module attachment element, the light seal module attachment element being configured to releasably engage the HMD module attachment element.

Clause 15: the light seal module further comprises a light seal module attachment element; and the head securement element further comprises a head securement element attachment element, the head securement element attachment element being configured to releasably engage the light seal module attachment element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
an HMD module comprising:
a frame having a frame inner side and a frame outer side;
a display element supported by the frame;
an HMD module attachment element on the frame inner side; and
extensions extending from the frame comprising engagement pins;
a light seal module comprising:
a chassis having a chassis inner side and a chassis outer side; and
a light seal module attachment element on the chassis outer side, the light seal module attachment element being configured to releasably engage the HMD module attachment element; and
a head securement element extending from the chassis inner side of the light seal module, the head securement element comprising:
a pair of arms, each of the arms comprising a head securement element attachment element coupled to the light seal module, each of the arms defining a channel therein, each of the channels receiving a corresponding one of the engagement pins to guide movement of the head securement element to be toward or away from the HMD module; and
a band having ends coupled to the arms, the band being configured to extend around a head, each of the channels of the arms being positioned between a corresponding head securement element attachment element and a corresponding end of the band.

2. The head-mountable device of claim 1, wherein:
each of the arms is rigid and pivotably coupled to the chassis of the light seal module; and
the band is flexible.

3. The head-mountable device of claim 2, wherein the ends of the band are coupled to the light seal module by the pair of arms.

4. The head-mountable device of claim 1, wherein the light seal module further comprises a cover extending about the chassis.

5. The head-mountable device of claim 1, wherein the head securement element comprises an electronic component.

6. The head-mountable device of claim 5, wherein the electronic component is operatively connected to the HMD module by the light seal module.

7. The head-mountable device of claim 5, wherein the electronic component is operatively connected to the HMD module by a wireless connection.

8. The head-mountable device of claim 5, wherein the electronic component is operatively connected to the HMD module by a wired connection that bypasses the light seal module.

9. A head-mountable device comprising:
an HMD module comprising a display element and extensions comprising engagement pins;
a light seal module coupled to the HMD module, the light seal module being configured to engage a face, provide a view to the display element, and block light from an external environment; and
a head securement element configured hold the HMD module and the light seal module against a head, the head securement element being coupled to the HMD module by only the light seal module, the head securement element comprising:
a pair of arms, each of the arms comprising an electronic component operably connected to the HMD module by the light seal module, each of the arms being rigid and pivotably coupled to the light seal module on an inner side of the light seal module that is opposite the HMD module, each of the arms defining a channel therein, each of the channels receiving a corresponding one of the engagement pins to guide movement of the head securement element to be toward or away from the HMD module; and a band having ends coupled to the arms, the band being flexible to extend around the head.

10. The head-mountable device of claim 9, wherein the light seal module is configured to be releasably coupled to the HMD module.

11. The head-mountable device of claim 9, wherein the head securement element is configured to be releasably coupled to the light seal module.

12. A head-mountable device comprising:
an HMD module comprising a display element and extensions comprising engagement pins; and
a light seal module comprising:
   a chassis; and
   a cover extending about the chassis; and
a head securement element comprising:
   a pair of arms, each of the arms comprising an electronic component operably connected to the HMD module by the light seal module, each of the arms being rigid and pivotably coupled to the chassis of the light seal module to transition between a deployed configuration, in which the arms extend away from the HMD module, and a collapsed configuration, in which the arms extend towards each other, each of the arms defining a channel therein, each of the channels receiving a corresponding one of the engagement pins to guide movement of the head securement element to be toward or away from the HMD module; and
   a band having ends coupled to the arms, the band being flexible to extend around a head.

13. The head-mountable device of claim 12, wherein:
the HMD module further comprises an HMD module attachment element; and
the light seal module further comprises a light seal module attachment element, the light seal module attachment element being configured to releasably engage the HMD module attachment element.

14. The head-mountable device of claim 12, wherein:
the light seal module further comprises a light seal module attachment element; and
the head securement element further comprises a head securement element attachment element, the head securement element attachment element being configured to releasably engage the light seal module attachment element.

15. The head-mountable device of claim 12, wherein the head securement element is coupled to the HMD module by only the light seal module.

* * * * *